(12) United States Patent
Hennige et al.

(10) Patent No.: US 7,892,673 B2
(45) Date of Patent: Feb. 22, 2011

(54) ELECTRIC SEPARATOR, METHOD FOR MAKING SAME AND USE THEREOF IN HIGH-POWER LITHIUM CELLS

(75) Inventors: Volker Hennige, Duelmen (DE); Christian Hying, Rhede (DE); Gerhard Hoerpel, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/846,940

(22) Filed: Jul. 30, 2010

(65) Prior Publication Data

US 2010/0291292 A1 Nov. 18, 2010

Related U.S. Application Data

(62) Division of application No. 10/524,143, filed as application No. PCT/EP03/07167 on Jul. 4, 2003.

(30) Foreign Application Priority Data

Aug. 24, 2002 (DE) ................. 102 38 941

(51) Int. Cl.
*H01M 2/14* (2006.01)
(52) U.S. Cl. .................. 429/129; 429/232; 428/113
(58) Field of Classification Search .................. 429/129, 429/232; 428/113
See application file for complete search history.

(56) References Cited

U.S. PATENT DOCUMENTS

| | | | |
|---|---|---|---|
| 5,389,471 A | 2/1995 | Kung | |
| 5,558,682 A | 9/1996 | Kawamura | |
| 5,691,077 A | 11/1997 | Yu | |
| 6,299,668 B1 | 10/2001 | Penth et al. | |
| 6,299,778 B1 | 10/2001 | Penth et al. | |
| 6,309,545 B1 | 10/2001 | Penth et al. | |
| 6,340,379 B1 | 1/2002 | Penth et al. | |
| 6,383,386 B1 | 5/2002 | Hying et al. | |
| 6,495,292 B1 | 12/2002 | Yen | |
| 6,620,320 B1 | 9/2003 | Hying et al. | |
| 6,841,075 B2 | 1/2005 | Penth et al. | |
| 2002/0023419 A1 | 2/2002 | Penth et al. | |
| 2002/0039648 A1 | 4/2002 | Horpel et al. | |
| 2004/0028913 A1 | 2/2004 | Hennige et al. | |
| 2004/0038105 A1 | 2/2004 | Hennige et al. | |
| 2004/0262169 A1 | 12/2004 | Hying et al. | |
| 2005/0031942 A1 | 2/2005 | Hennige et al. | |
| 2005/0087491 A1 | 4/2005 | Hennige et al. | |

FOREIGN PATENT DOCUMENTS

| | | |
|---|---|---|
| CN | 1132946 A | 10/1996 |
| JP | 6-236752 | 8/1994 |
| JP | 8-64193 | 3/1996 |
| JP | 10-326607 A | 12/1998 |
| JP | 11-80395 | 3/1999 |
| JP | 2000-30686 | 1/2000 |
| KR | 10-0721688 | 5/2007 |
| WO | 99/15262 | 4/1999 |
| WO | 2004/021477 | 3/2004 |

*Primary Examiner*—Jane Rhee
(74) *Attorney, Agent, or Firm*—Oblon, Spivak, McClelland, Maier & Neustadt, L.L.P.

(57) ABSTRACT

The present invention relates to electrical separators and to a process for producing them.

An electrical separator is a separator used in batteries and other arrangements in which electrodes have to be separated from each other while maintaining ion conductivity for example. The separator is preferably a thin porous insulating material processing high ion perviousness, good mechanical strength and long-term stability to the chemicals and solvents used in the system, for example in the electrolyte of the battery. In batteries, the separator shall fully electrically insulate the cathode from the anode. Moreover, the separator shall be permanently elastic and follow movements in the system, for example in the electrode pack in the course of charging and discharging.

This object is achieved by an electrical separator according to the invention, comprising a sheetlike flexible substrate having a multiplicity of openings and having a coating on and in said substrate, said substrate being a polymeric nonwoven and said coating being a porous electrically insulating ceramic coating, said separator being characterized by said nonwoven having a thickness of less than 30 μm, a porosity of more than 50% and a pore radius distribution in which at least 50% of the pores have a pore radius from 75 to 150 μm.

11 Claims, No Drawings

ELECTRIC SEPARATOR, METHOD FOR MAKING SAME AND USE THEREOF IN HIGH-POWER LITHIUM CELLS

An electrical separator is a separator used in batteries and other arrangements in which electrodes have to be separated from each other while maintaining ion conductivity for example.

The separator is customarily a thin porous insulating material possessing high ion perviousness, good mechanical strength and long-term stability to the chemicals and solvents used in the system, for example in the electrolyte of the battery. In batteries, the separator should fully electronically insulate the cathode from the anode, but be pervious to the electrolyte. Moreover, the separator has to be permanently elastic and follow movements in the system, for example in the electrode pack in the course of charging and discharging.

The separator is a crucial determinant of the use life of the arrangement in which it is used, for example the use life of battery cells. Progress in the field of rechargeable batteries is therefore dependent on progress in the development of suitable separator materials.

General information about electrical separators and batteries may be found for example in J. O. Besenhard in "Handbook of Battery Materials" (VCH-Verlag, Weinheim 1999).

Separators in use at present consist predominantly of porous organic polymeric films or of inorganic nonwovens, for example nonwovens composed of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/polypropylene composite.

Disadvantages of these organic polyolefin separators are their relatively low thermal stability limit of distinctly below 150° C. and also their low chemical stability in inorganic lithium battery cells. When used in lithium batteries as a separator, polyolefins are gradually attacked by the lithium or the lithiated graphite. In systems comprising a polymer electrolyte, a dense oxidation product layer is therefore formed and prevents further destruction of the separator in lithium ion batteries.

There have been initial attempts to use inorganic composite materials as separators. For instance, DE 198 38 800 encompasses an electrical separator comprising a sheetlike flexible substrate having a multiplicity of openings and having a coating on said substrate, the separator being characterized in that the material of said substrate is selected from metals, alloys, plastics, glass and carbon fiber or a combination thereof and said coating is a two-dimensionally continuous porous electrically nonconducting ceramic coating. The separators, which as exemplified are supported by electrically conductive material, however, have been determined to be unsuitable for lithium ion cells, since the coating cannot be produced over a large area without flaws at the thickness described and consequently shortcircuiting can occur very easily.

It can be stated in summary that there is at present no suitable separator material for producing wound inorganic high power or high energy batteries in particular in an economical manner.

We were able to show in previous work (DE 101 42 622) that it is possible to achieve this using a material comprising a sheetlike flexible substrate having a multiplicity of openings and having a coating on and in this substrate, the material of the substrate being selected from woven or non-woven nonelectroconductive fibers of glass or ceramic or a combination thereof and the coating being a porous electrically insulating ceramic coating, the resulting separator having a thickness of less than 100 µm and being bendable, having a sufficiently low resistance in conjunction with the electrolyte and yet possessing sufficiently good long-term stability. But the resistance of these separators is still too high for a multiplicity of applications, since the substrate used is a woven glass fiber fabric which is firstly too thick and secondly insufficiently porous.

It would also be desirable to be able to use a both thermally and chemically stable separator. It is therefore an object of the present invention to provide a separator which is thermally more stable than existing polymeric separators.

It was found in the course of the ongoing optimization of the properties of the separators described in DE 101 42 622 that separators having the properties mentioned are achievable by using polymeric substrate materials. This provides electrical separators comprising a sheetlike flexible substrate having a multiplicity of openings and having a coating on and in this substrate, the material of the substrate being selected from non-woven nonelectroconductive fibers of polymers and the coating being a porous electrically insulating ceramic coating. The separator has a thickness of less than 80 µm and is bendable and has a sufficiently low resistance in conjunction with an electrolyte and also possesses sufficient long-term stability. The chemical stability to strong bases is obtained by using stable polymers such as for example polypropylene/polyethylene or polyacrylonitrile nonwoven and stable ceramic materials such as $ZrO_2$ and $TiO_2$. Although the separators, described in the as yet unpublished application DE 102 08 277, are very highly suitable for the tasks described, we have been forced to recognize that the separators described therein are not especially suitable for use in lithium high power batteries, since these batteries have to give off large currents within a very short time at virtually constant voltage. The separators described in DE 102 08 277, we believe, do not meet the performance requirements of such separators for lithium high power batteries because they are insufficiently porous and too thick and hence still insufficiently ion-conductive.

It is accordingly an object of the present invention to provide a separator which is suitable for use in lithium high power batteries. In order that a separator may be useful for such a battery system it must have a distinctly improved porosity and a very low thickness, which is why it is a further object of the present invention to provide a separator which has a higher porosity than existing separators, but also combines a high mechanical and thermal stability with a very low thickness.

It has now been found that, surprisingly, separators which comprise a nonwoven having a thickness of less than 30 µm, a porosity of more than 50% and a substantially homogeneous pore radius distribution in which at least 50% of the pores have pore radii from 75 to 150 µm and in which the nonwoven has been provided, on and in the nonwoven, with a porous inorganic coating which preferably comprises zirconium oxide or silicon oxide adhered particles having a particle size from 0.5 to 7 µm have a high porosity, an ideal pore size and a low thickness coupled with very good thermal, mechanical and chemical stability and therefore are distinctly more useful as separators in lithium high power batteries.

The present invention accordingly provides a separator comprising a flexible nonwoven having a porous inorganic coating on and in said nonwoven, the material of said nonwoven being selected from non-woven nonelectroconductive polymeric fibers, characterized by said nonwoven having a thickness of less than 30 µm, a porosity of more than 50% and preferably from 50 to 97% and a pore radius distribution in which at least 50% of the pores have a pore radius from 75 to 150 µm.

The present invention further provides a process for producing a separator according to the present invention, which comprises providing a flexible nonwoven which has a thickness of less than 30 µm, a porosity of from 50 to 97% and a pore radius distribution in which at least 50% of the pores have a pore radius from 75 to 150 µm with a coating on and in said substrate, the material of said nonwoven being selected from non-woven nonelectroconductive polymeric fibers.

The present invention yet further provides for the use of a separator according to the invention as a separator in lithium high power batteries and also corresponding lithium high power batteries which comprise a separator according to the present invention.

In general, the larger the pores in the separator for the same porosity and tortuosity, the lower the resistance which ensues when the pores are filled with electrolyte. Moreover, the porosity of the separator can be influenced through the choice of suitable particles, and this similarly leads to modified properties. A separator parameter which is frequently quoted in this context is the Gurley number. It is a measure of the gas permeability of the dry porous separator. As described by 0. Besenhard in the Handbook of Battery Materials, the conductivity of a known system can be inferred directly from the Gurley number. In generalized terms, a higher gas permeability (i.e. a smaller Gurley number) will result in a higher conductivity for the wetted separator in the battery cell. The Gurley numbers of commercially available separators range from 10 to 50, when the pore diameter is around 0.1 µm, and from 20 to 100, when the pore diameter is around 0.05 µm (G. Venugiopal; J. of Power Sources 77 (1999) 34-41).

However, it must always be borne in mind that an extremely small Gurley number can also be evidence of defects, ie large holes, in the separator. These defects can lead to an internal short circuit in operation of a battery. The battery can then very rapidly self-discharge in a hazardous reaction. In the process, large electric currents occur that may even cause a contained battery cell to explode in the extreme case. For this reason, the separator can make a decisive contribution to the safety, or lack of safety, of a lithium high power or high energy battery. Therefore, the separator is a decisive structural component of a battery and deserving of a great deal of attention.

Polymeric separators do provide for example the safety performance required at present for lithium batteries by impeding any ionic transport between the electrodes beyond a shutdown temperature, which is about 120° C. This is because, at this temperature, the pore structure of the separator collapses and all the pores close up. As a result of ionic transport being stopped, the hazardous reaction which can lead to an explosion ceases. However, if the cell is further heated owing to external circumstances, the breakdown temperature is exceeded at about 150 to 180° C. At this temperature, the separator starts to melt and contract. The two electrodes then come into direct contact at many locations in the battery cell and so there is an internal short circuit over a large area. This leads to an uncontrolled reaction which ends with the cell exploding, or the resultant pressure is released by an overpressure valve (a bursting disk), frequently with signs of fire.

The separator of the present invention is a hybrid separator in that it comprises inorganic components and a polymeric carrier material. Shutdown, then, occurs with the hybrid separator of the present invention when, owing to the high temperature, the polymeric structure of the carrier material melts and penetrates into the pores of the inorganic material, thereby closing them. Meltdown, however, does not occur with the separator of the present invention. By virtue of its shutdown mechanism in the battery cells, the separator of the present invention thus meets the requirements, voiced by various battery manufacturers, for a safety switchoff mechanism. The inorganic particles ensure that there can never be a meltdown. It is thus ensured that there can never be a large-area short circuit.

If an additional shutdown mechanism is absolutely necessary for practical use, this can also be achieved by equipping the surface and/or the pores of the ceramic or hybrid separator of the present invention with a material which, on attainment of the temperature limit, occludes the pores and prevents continued ion flux. This can be accomplished for example by means of a polymer or wax whose melting point is in that range.

The separator of the present invention is also very safe in the event of an internal short circuit due to an accident for example. If, for example, a nail were to puncture a battery, the following would happen, depending on the type of separator: a polymeric separator would melt at the site of puncture (a short circuit current flows through the nail and causes it to heat up) and contract. As a result, the short circuit location would become larger and larger and the reaction could get out of control. Only the polymeric substrate material would melt in the hybrid separator of the present invention, if at all, but not the inorganic separator material. So the reaction in the interior of the battery cell following such an accident would proceed much more moderately. This battery is thus distinctly safer than one with a polymeric separator. This is an important factor in mobile applications in particular.

The separator of the present invention also has a distinct cost advantage over separators based on woven glass or ceramic fabrics as described in DE 101 42 622 for example. One reason for this, in addition to the widely disparate material costs, is that the polymeric substrate is substantially simpler to handle than woven glass or ceramic fabric, which, after all, has a certain brittleness and is destroyed by careless handling. The entire manufacturing operation is therefore less convenient and hence more cost intensive.

The nature of the nonwoven used, which comprises a particularly useful combination of thickness and porosity, makes it possible to produce separators which meet the requirements for separators in high power batteries, especially lithium high power batteries. The concomitant use of precisely size-adapted oxide particles for producing the porous ceramic coating achieves a particularly high porosity for the ready-produced separator with the pores still being sufficiently small to prevent lithium whiskers growing through the separator.

A particularly advantageous way to achieve an ideal pore size or porosity for the separator is for the oxide particles used, prior to the suspending, to be classified by wind sifting in order that ideally equal-sized oxide particles may be used, since commercially available metal oxide particles frequently contain a not inconsiderable fraction of particles which are distinctly smaller than the average particle size. But the presence of a large number of smaller particles has the consequence that the pores are partly obstructed, or completely occluded, by these small particles. It is then not always possible to achieve the ideal pore size or porosity for the separator.

It is additionally possible to conduct a hydro-classification in the form of a wet-sieving operation in order that large particles may be separated off. The coarse fraction of up to 5% by weight of the total powder includes in the least favorable case particles which are larger than the overall thickness of the separator. Flawless coatings are impossible to achieve with these powders. Consequently, they have to be removed just in case. The maximum particle size is preferably from 1/3 to 1/5 and more preferably not more than 1/10 of the nonwoven thickness.

Furthermore, the particle-containing suspensions (slips) can be separated by classifying centrifugation so as to exclusively obtain the ideal particle fraction which additionally possesses a fairly narrow particle size distribution.

The high porosity in conjunction with the low thickness of the separator also makes it possible for the separator to be completely, or at least substantially completely, saturated with the electrolyte, so that it is impossible for dead spaces, in which no electrolyte is present, to arise in individual regions of the separator and hence in certain coils or layers on the battery cells. This is achieved in particular when, by virtue of the size of the oxide particles being controlled, the separators obtained are free or substantially free of closed pores into which the electrolyte cannot penetrate.

The separators of the present invention also have the advantage that the anions of the conducting salt will partly accumulate at the inorganic surfaces of the separator material, improving the dissociation and hence the ion conductivity in the high current range. A further, not inconsiderable advantage of the separator according to the present invention is its very good wettability. The hydrophilic ceramic coating ensures that the wetting with electrolytes takes place very rapidly, which likewise leads to a somewhat improved conductivity.

The advantages of the separator according to the present invention for use in high power lithium ion batteries can be summarized as follows:
High porosity
Ideal pore size
Low thickness of separator
Low basis weight
Very good wettability
Improved dissociation of conducting salt The separator according to the present invention and a process for producing it will now be described without the invention being limited to these embodiments.

The separator according to the present invention, comprising a flexible nonwoven having a porous inorganic coating on and in said nonwoven, the material of the nonwoven being selected from non-woven nonelectroconductive polymeric fibers, is characterized by the nonwoven having a thickness of less than 30 μm, a porosity of more than 50% and preferably from 50 to 97% and a pore radius distribution in which at least 50% of the pores have a pore radius from 75 to 150 μm.

The separator according to the present invention more preferably comprises a nonwoven from 5 to 30 μm and preferably from 10 to 20 μm in thickness. A particularly important requirement for use in a separator according to the present invention is a very homogeneous pore radius distribution in the nonwoven, as indicated above. An even more homogeneous pore radius distribution in the nonwoven in conjunction with optimally adapted oxide particles of a specific size leads to an optimized porosity for the separator according to the present invention.

The porosity of the nonwoven is preferably in the range from 60 to 90% and more preferably in the range from 70 to 90%. Porosity in this context is defined as the volume of the nonwoven (100%) minus the volume of fibers of the nonwoven, ie the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers. The large porosity of the substrate also means a higher porosity for the hybrid separator according to the present invention, which is why a higher uptake of electrolytes is obtainable with the separator of the present invention. Preferred nonwovens are nonwovens formed from polymeric fibres.

To be able to obtain a separator having insulating properties, the nonwoven used preferably comprises nonelectroconductive fibers of polymers which are preferably selected from polyacrylonitrile (PAN), polyester, for example polyethylene terephthalate, and/or polyolefin (PO), for example polypropylene (PP) or polyethylene (PE) or mixtures of such polyolefins. The polymeric fibers of the nonwovens are preferably from 0.1 to 10 μm and more preferably from 1 to 4 μm in diameter. Particularly preferred flexible nonwovens have a basis weight of less than 20 g/m$^2$ and preferably from 5 to 10 g/m$^2$.

The separators according to the present invention are preferably less than 35 μm, more preferably less than 25 μm and most preferably from 15 to 25 μm in thickness. The thickness of the substrate has a substantial influence on the properties of the separator, since not only the flexibility but also the sheet resistance of the electrolyte-saturated separator is dependent on the thickness of the substrate. The low thickness provides a particularly low electrical resistance of the separator in use with an electrolyte. The separator itself, of course, has a very high electrical resistance, since it itself has to have insulating properties. In addition, thinner separators permit an increased packing density in a battery stack, so that a large amount of energy can be stored in the same volume.

The separator according to the present invention, on and in the nonwoven, comprises a porous electrically insulating ceramic coating. Preferably, the porous inorganic coating present on and in the nonwoven comprises oxide particles of the elements Al, Si and/or Zr having an average particle size of 0.5 to 7 μm, more preferably from 1 to 5 μm and most preferably from 1.5 to 3 μm. More preferably, the separator comprises a porous inorganic coating present on and in the nonwoven that comprises aluminum oxide particles having an average particle size from 0.5 to 7 μm, more preferably from 1 to 5 μm and most preferably from 1.5 to 3 μm that are adhered together by an oxide of the elements Zr or Si. To obtain a very high porosity, preferably more than 50% by weight and more preferably more than 80% by weight of all the particles lie within the abovementioned limits for the average particle size. As mentioned, the maximum particle size is preferably from 1/3 to 1/5 and more preferably not more than 1/10 of the thickness of the nonwoven used.

The separator is preferably from 30 to 80%, more preferably from 40 to 75% and most preferably from 45 to 70% in porosity. Porosity here refers to accessible, ie open, pores. The porosity in this sense can be determined by the familiar method of mercury porosimetry or can be calculated from the volume and the density of the ingredients used on the assumption that open pores only are present.

The separators according to the present invention may have a breaking strength of at least 1 N/cm, preferably at least 3 N/cm and most preferably from 3 to 10 N/cm. The separators according to the present invention are preferably bendable around a radius down to 100 m, more preferably down to 50 mm and most preferably down to 1 mm without damage. The high breaking strength and the good bendability of the separator according to the present invention has the advantage that the separator is able to follow electrode geometry changes occurring in the course of the charging and discharging of a battery without the separator becoming damaged. The bendability, moreover, has the advantage that commercially standardized wound cells can be manufactured using this separator. With these cells, the electrode-separator plies are spirally wound up with each other in standardized size and contacted.

It may be preferable for the separator to possess a noninherent shutdown mechanism. This noninherent shutdown mechanism can be achieved for example by having, on or in the separator, a very thin layer of waxy or polymeric particles which melt at a desired shutdown temperature, so-called shutdown particles. Particularly preferred materials for the shutdown particles include for example natural or artificial waxes or low-melting polymers, for example polyolefins, the material for the shutdown particles being chosen so that the particles melt at the desired shutdown temperature and close the pores of the separator, preventing further ion flux.

The shutdown particles preferably have an average particle size ($D_w$) which is not less than the average size ($d_s$) of the pores of the porous inorganic layer of the separator. This is advantageous in particular because this prevents pores of the separator layer being penetrated and closed, which would result in a reduction in the pore volume and hence in the conductivity of the separator and also the performance of the battery. The thickness of the shutdown particle layer is only critical insofar as an excessively thick layer would unnecessarily increase the resistance in the battery system. To ensure safe shutdown, the shutdown particle layer should have a thickness ($Z_w$) ranging from approximately equal to the average particle size of the shutdown particles ($D_w$) up to 10 $D_w$ and preferably from 2 $D_w$ to $D_w$. A thus equipped separator possesses a primary safety feature. But, unlike the purely organic separator materials, this separator cannot completely melt and there can thus never be a meltdown. These safety features are very important because of the very large energy quantities for high energy batteries and therefore are frequently stipulated.

The separator according to the present invention is preferably obtainable by a process for producing a separator that comprises providing a flexible nonwoven which has a thickness of less than 30 µm, a porosity of more than 50% and preferably from 50 to 97% and a pore radius distribution in which at least 50% of the pores have a pore radius from 75 to 150 µm with a porous inorganic coating on and in said flexible nonwoven by applying to said nonwoven a suspension comprising metal oxide particles and at least one sol and heating one or more times to solidify said suspension on and in said nonwoven, the material of said nonwoven being selected from non-woven nonelectroconductive polymeric fibers. Preferably, the suspension comprises metal oxide particles having an average particle size diameter from 0.5 to 7 µm, more preferably from 1 to 5 µm and most preferably from 1.5 to 3 µm, of the metals Al, Zr and/or Si and at least one sol.

The process itself is known in principle from WO 99/15262, but not all the parameters and ingredients, especially nonelectroconductive ingredients, can be used for producing the separator of the present invention. Especially the particles used for producing the dispersion and also the nonwovens used as a substrate differ distinctly from the hitherto described ingredients.

The suspension may be brought onto and into the nonwoven for example by printing on, pressing on, pressing in, rolling on, knifecoating on, spreadcoating on, dipping, spraying or pouring on.

The nonwoven used is preferably less than 20 µm, more preferably less than 15 µm and most preferably from 7.5 to 15 µm in thickness. Particular preference is given to using nonwovens as described in the description of the separator according to the present invention.

The nonwoven used is preferably a nonwoven consisting of or at least containing polymeric fibers. The polymeric fibers are preferably selected from polyacrylonitrile, polyester, for example polyethylene terephthalate, and/or polyolefins. But any other known polymeric fibers are useful, provided they not only have the thermal stability required for producing the separators but also are stable under the operating conditions in the lithium battery. The separator according to the present invention preferably comprises polymeric fibers having a softening temperature of above 100° C. and a melting temperature of above 110° C. It may be preferable for the polymeric fibers to be from 0.1 to 10 µm and preferably from 1 to 5 µm in thickness.

The suspension used for coating comprises at least one sol of the elements Al, Zr and/or Si and is prepared by suspending oxide particles in at least one of these sols. The sols are obtainable by hydrolyzing at least one compound with water or an acid or a combination thereof. It may be preferable for the compound to be hydrolyzed to be introduced into alcohol or an acid or a combination of these liquids prior to hydrolysis. The compound to be hydrolyzed is preferably at least one nitrate, chloride, carbonate, alkoxide of the elements Al, Zr and/or Si. The hydrolysis is preferably carried out in the presence of liquid water, water vapor, ice or an acid or a combination thereof.

In one embodiment of the process according to the present invention, hydrolysis of the compounds to be hydrolyzed is used to prepare particulate sols. These particulate sols are notable for the compounds formed by hydrolysis being present in the sol in particulate form. The particulate sols can be prepared as described above or as in WO 99/15262. These sols customarily have a very high water content, which is preferably above 50% by weight. It can be advantageous for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, particularly preferably with a mineral acid selected from sulfuric acid, hydrochloric acid, perchloric acid, phosphoric acid and nitric acid or a mixture thereof. The particulate sols thus prepared can subsequently be used for preparing suspensions, in which case it is preferable to prepare suspensions for application to polymeric sol pretreated polymeric fiber nonwovens.

In a further embodiment of the process of the present invention, hydrolysis of the compounds to be hydrolyzed is used to prepare polymeric sols. In this preferred embodiment of the process of the present invention, the sol has a water and/or acid fraction of less than 50% by weight. These polymeric sols are notable for the fact that the compounds formed by hydrolysis are present in the sol in polymeric form, ie in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio of liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 500 less than the preferred amount of half the molar ratio is possible but not very sensible, since hydrolysis would no longer be complete and coatings based on such sols would not be very stable using an amount below this value.

To prepare these sols it can be advantageous for the compound to be hydrolyzed to be dissolved in an organic solvent, especially ethanol, isopropanol, butanol, amyl alcohol, hexane, cyclohexane, ethyl acetate and/or mixtures thereof, before the actual hydrolysis is carried out. A sol thus prepared can be used for preparing the suspension of the present invention.

Both the particulate sols (large water fraction, low solvent fraction) and polymeric sols (low water fraction, large solvent fraction) can be used as a sol to prepare the suspension in the process of the present invention. Not just sols which are obtainable as just described can be used, but in principle also commercially available sols, for example zirconium nitrate sol or silica sol. The process of preparing separators by applying a suspension to and solidifying it on a carrier is known per se from DE 101 42 622 and in similar form from WO 99/15262, but not all the parameters and ingredients are applicable to the preparation of the membrane of the present invention. More particularly, the operation described in WO 99/15262 is in that form not fully applicable to polymeric nonwoven materials, since the very watery sol systems described therein frequently do not permit complete, in-depth wetting of the customarily hydrophobic polymeric nonwovens, since most polymeric nonwovens are only badly wetted by the very watery sol systems, if at all. It has been determined that even the minutest unwetted areas in the nonwoven material can lead to membranes or separators being obtained that have defects and hence are inutile.

It has now been found that, surprisingly, a sol system or suspension whose wetting behavior has been adapted to the polymers will completely penetrate the nonwoven materials and so provide defect-free coatings. In the process of the present invention, it is therefore preferable to adapt the wetting behavior of the sol or suspension. This is preferably accomplished by preparing sols or suspensions comprising one or more alcohols, for example methanol, ethanol or propanol or mixtures thereof, and/or aliphatic hydrocarbons. But other solvent mixtures are conceivable as well for addition to the sol or suspension in order that the wetting behavior thereof may be adapted to the nonwoven used.

The mass fraction of the suspended component (metal oxide particles) in the suspension is preferably from 1 to 100 times, more preferably from 1 to 50 times and most preferably from 1 to 10 times that of the sol used. It is particularly preferable for the metal oxide particles used for preparing the suspension to be aluminum oxide particles which preferably have an average particle size from 0.5 to 7 μm. Aluminum oxide particles in the range of the preferred particle sizes are available for example from Martinswerke under the designations MDS 6; DN 206, MZS 3 and MZS 1 and from Alcoa with the designation CL3000 SG, CT800 SG and HVA SG.

It has been determined that the use of commercially available metal oxide particles may in certain circumstances lead to unsatisfactory results, since the particle size distribution is frequently very large. It is therefore preferable to use metal oxide particles which were classified by a conventional process, for example wind sifting, centrifugation and hydroclassification. It is preferable for the metal oxide particles used to be a fraction for which the coarse grain fraction, which accounts for up to 10% of the total amount, was separated off by wet sieving. This unwelcome coarse grain fraction, which is very difficult or impossible to comminute even by the typical processes of slip production such as, for example, grinding (ball mill, attritor mill, pestle mill), dispersing (Ultra-Turrax, Ultrasound), trituration or chopping, can consist for example of aggregates, hard agglomerates, grinding media attritus. The aforementioned measures ensure that the inorganic porous layer has a very uniform pore size distribution.

This is achieved in particular by using metal oxide particles whose maximum particle size is preferably from ⅓ to ⅕ and more preferably more than 1/10 of the thickness of the nonwoven used.

Table 1 hereinbelow gives an overview of how the choice of the various aluminum oxides affects the porosity and the resulting pore size of the respective porous inorganic coating. To determine these data, the corresponding slips (suspensions) were prepared and dried and solidified as pure moldings at 200° C.

TABLE 1

Typical data of ceramics as function of powder type used

| $Al_2O_3$ type | Porosity/% | Average pore size/nm |
|---|---|---|
| AlCoA CL3000SG | 51.0 | 755 |
| AlCoA CT800SG | 53.1 | 820 |
| AlCoA HVA SG | 53.3 | 865 |
| AlCoA CL4400FG | 44.8 | 1015 |
| Martinsw. DN 206 | 42.9 | 1025 |
| Martinsw. MDS 6 | 40.8 | 605 |
| Martinsw. MZS 1 + Martinsw. MZS 3 = 1:1 | 47% | 445 |
| Martinsw. MZS 3 | 48% | 690 |

To improve the adhesion of the inorganic components to polymeric fibers as a substrate, it can be advantageous for the suspensions used to be admixed with adhesion promoters, for example organofunctional silanes. Useful adhesion promoters include in particular compounds selected from the octylsilanes, the vinylsilanes, the amine-functionalized silanes and/or the glycidyl-functionalized silanes, for example the Dynasilanes from Degussa. Particularly preferred adhesion promoters for polyethylene (PE) and polypropylene (PP) are vinyl-, methyl- and octylsilanes, although an exclusive use of methylsilanes is not optimal, for polyamides and polyamines they are amine-functional silanes, for polyacrylates and polyesters they are glycidyl-functionalized silanes and for polyacrylonitrile it is also possible to use glycidyl-functionalized silanes. Other adhesion promoters can be used as well, but they have to be adapted to the respective polymers. The adhesion promoters accordingly have to be selected so that the solidification temperature is below the melting or softening temperature of the polymer used as substrate and below its decomposition temperature. Suspensions according to the present invention preferably include distinctly less than 25% by weight and more preferably less than 10% by weight of compounds capable of acting as adhesion promoters. An optimal fraction of adhesion promoter results from coating the fibers and/or particles with a mono-molecular layer of the adhesion promoter. The amount in grams of adhesion promoter required for this purpose can be obtained by multiplying the amount in g of the oxides or fibers used by the specific surface area of the materials in $m^2 g^{-1}$ and then dividing by the specific area required by the adhesion promoter in $m^2 g^{-1}$, the specific area required frequently being in the order of from 300 to 400 $m^2 g^{-1}$.

Table 2 which follows contains an illustrative overview of usable adhesion promoters based on organofunctional silicon compounds for typical nonwoven material polymers.

TABLE 2

| Polymer | Organofunctional type | Adhesion promoter |
|---------|----------------------|-------------------|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane In a particular embodiment of the process according to the present invention, the abovementioned adhesion promoters are applied to the polymeric nonwoven (substrate), in a preceding step. To this end, the adhesion promoters are dissolved in a suitable solvent, for example ethanol. This solution may additionally include a small amount of water, preferably from 0.5 to 10 times the molar amount of the hydrolyzable group, and small amounts of an acid, for example HCl or $HNO_3$, as a catalyst for the hydrolysis and condensation of the Si—OR groups. This solution is applied to the substrate by the familiar techniques, for example spraying on, printing on, pressing on, pressing in, rolling on, knifecoating on, spreadcoating on, dipping, spraying or pouring on, and the adhesion promoter is fixed on the substrate by a thermal treatment at from to not more than 350° C. It is only after the adhesion promoter has been applied in this embodiment of the process according to the present invention that the suspension is applied and solidified.

Application of an adhesion promoter prior to the actual application of the suspension provides improved adhesivity of the substrates especially with regard to aqueous particulate sols, which is why especially thus pretreated substrates can be coated according to the present invention with suspensions based on commercially available sols, for example zirconium nitrate sol or silica sol. But this way of applying an adhesion promoter also means that the production process of the separator according to the present invention has to be extended to include an intervening or preliminary treatment step. This is feasible albeit more costly and inconvenient than the use of adapted sols to which adhesion promoters have been added, but also has the advantage that better results are obtained even on using suspensions based on commercially available sols.

The coatings according to the invention are applied to the nonwoven by solidifying the suspension in and on the nonwoven. According to the present invention, the suspension present on and in the nonwoven can be solidified by heating at from 50 to 350° C. Since the maximum temperature is dictated by the nonwoven used when polymeric substrate materials are used, the maximum temperature must be adapted accordingly. Thus, depending upon the embodiment of the process according to the present invention, the suspension present on and in the nonwoven is solidified by heating at from 100 to 350° C. and most preferably by heating at from 110 to 280° C. It can be advantageous for the heating to take place at from 100 to 350° C. for from 1 second to 60 minutes. It is more preferable to solidify the suspension by heating at from 110 to 300° C. and most preferably at from 110 to 280° C. and preferably for from 0.5 to 10 min.

The assembly may be heated according to the present invention by means of heated air, hot air, infrared radiation or by other heating methods according to the prior art.

The process according to the present invention can be carried out for example by unrolling the polymeric nonwoven substrate off a roll, passing it at a speed of from 1 m/h to 2 m/s, preferably at a speed of from 0.5 m/min to 20 m/min and most preferably at a speed of from 1 m/min to 5 m/min through at least one apparatus which applies the suspension atop and into the substrate, for example a roller, and at least one further apparatus whereby the suspension is solidified on and in the support by heating, for example an electrically heated furnace, and rolling the separator thus produced up on a second roll. This makes it possible to produce the separator according to the present invention in a continuous process. Similarly, the pretreatment steps can be carried out on a continuous basis by observing the parameters mentioned.

It has been determined to be particularly advantageous for the process to be carried out with the nonwoven and especially the polymeric nonwoven having a maximum tension of 10 N/cm and preferably of 3 N/cm in the longitudinal direction during the coating operation or operations. The term "coating operations" refers in this context to all process steps in which a material is brought onto and into the substrate and is solidified there by heat treatment, ie including the application of the adhesion promoter. Preferably, the substrate is tensioned with a maximum force of 0.01 N/cm during the coating operations. It may be particularly preferable for the substrate to be tensionless in the longitudinal direction during the coating operation or operations.

The pulling tension can be controlled during the coating in order that no deformation, even an elastic one, of the carrier material may take place. Possible deformation (stretching) due to excessive pulling tension can mean that the ceramic coating cannot follow the nonwoven material of construction, the consequence being that the coating will become detached from the nonwoven material over the entire area. The resulting product can then not be used for the intended purpose.

The separator according to the present invention may be equipped with an additional automatic shutdown mechanism by, for example, applying a layer of particles which, at a desired temperature, melt and close the pores of the separator, so-called shutdown particles, to the separator after the solidification of the applied suspension on the substrate to create a shutdown mechanism, and fixing the layer of shutdown particles. The layer of shutdown particles can be created for example by applying a suspension of waxy particles having an average particle size larger than the average pore size of the separator in a sol, water, solvent or solvent mixture.

The suspension for applying the particles contains preferably from 1 to 50% by weight, more preferably from 5 to 40% by weight and most preferably from 10 to 30% by weight of shutdown particles, especially wax particles, in the suspension.

Since the inorganic coating on the separator frequently has a very hydrophilic character, it has been determined to be advantageous for the coating on the separator to be prepared using a silane in a polymeric sol as an adhesion promoter and thus be hydro-phobicized. To achieve good adhesion and uniform dissipation of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic coating is hydrophobicized by treatment with alkyl-, aryl- or fluoroalkylsilanes marketed for example by Degussa under the tradename of Dynasilane. It is possible in this context to employ for example the familiar hydrophobicization methods which are employed inter alfa for textiles (D. Knittel; E. Schollmeyer; *Melliand Textilber.* (1998) 79(5), 362-363), with minimal changes to the recipes, for the porous coatings on the separator as well. To this end, the coating or separator is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy-(3,3,4,4,5,5,6,6,7,7,8,8-tridecafluorooctyl)silane, but a treatment with methyltriethoxysilane or i-butyl-triethoxysilane is completely sufficient to obtain the desired effect. The solutions are stirred at room temperature to achieve uniform dissipation of the hydrophobic materials in the solution and subsequently applied to the inorganic coating on the separator and dried. Drying can be speeded up by treatment at temperatures from 25 to 100° C.

In a further version of the process according to the present invention, the porous inorganic coating can also be treated with other adhesion promoters before the shutdown particles are applied. The treatment with one of the hereinbelow mentioned adhesion promoters can then likewise be effected as described above, ie by treating the porous inorganic layer with a polymeric sol which includes a silane adhesion promoter.

The layer of shutdown particles is preferably created by applying to the inorganic coating on the separator a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size (1%) of not less than and preferably greater than the average size of the pores of the porous inorganic layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_s$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5% to 50% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to an inorganic layer of the separator even when the layer was not hydrophobicized beforehand. It will be appreciated that a suspension with adhesion promoter can also be applied to a hydrophobicized layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxy-silane), MEMO (3-methacryloyloxypropyltrimethoxy-silane), Silfin (vinylsilane+initiator+catalyst), VTEO (vinyltriethoxysilane) or VTMO (vinyltrimethoxy-silane). Such silanes are available for example from Degussa as an aqueous solution under the designation Dynasilane 2926, 2907 or 2781. An adhesion promoter fraction of not more than 10% by weight has been determined to be sufficient for ensuring sufficient adhesion of the shutdown particles to the porous inorganic layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of poly-propylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the shutdown particles to be fixed after they have been applied to the porous inorganic layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the shutdown particle suspension with subsequent drying and any heating to above the glass transition temperature can be carried out continuously or quasicontinuously. When the starting material used is a flexible separator it can again be unwound off a roll, passed through a coating, drying and, if used, heating apparatus and then be rolled up again.

Hybrid separators according to the present invention are useful as separators in batteries. When the separator is used according to the invention as a separator in batteries, the separator is customarily placed in electrolyte-saturated form between the anode and the cathode.

The separator according to the present invention is useful for primary and secondary (rechargeable) lithium batteries, for nickel metal hydride, nickel-cadmium, silver-zinc and zinc-air batteries. Owing to its particularly high porosity and the large pores, the separator according to the present invention is particularly useful in lithium high power batteries.

As well as batteries comprising a separator according to the present invention, the present invention accordingly provides in particular lithium high power batteries comprising a separator according to the present invention.

The separators according to the present invention are similarly useful in rapidly charged batteries. Such high performance batteries are very rapidly charged as well as discharged. Of advantage here are in particular the optimized properties of the separator with regard to thickness, pore radius, porosity and consequently the high ion conductivity of the electrolyte-saturated separator. Owing to the high thermostability of the separator according to the present invention, a battery which is equipped with this separator will not be so temperature sensitive and therefore will be able to withstand the temperature increase due to the rapid charging without adverse changes to the separator or damage to the battery. These batteries are consequently distinctly more rapid to charge.

This is a distinct advantage with regard to the use of thus equipped batteries in electrical vehicles, since these no longer have to be charged for several hours but instead the charging can be done ideally in the course of an hour or less.

The nonlimiting examples which follow illustrate the present invention.

EXAMPLE 1

Production of an S450PET Separator

To 160 g of ethanol are initially added 15 g of a 5% by weight aqueous HCl solution, 10 g of tetraethoxysilane, 2.5 g of methyltriethoxysilane and 7.5 g of GLYMO Dynasilane (all Dynasilanes produced by Degussa AG). This sol, which was initially stirred for some hours, is then used to suspend 125 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

This slip is then used to coat a PET nonwoven about 30 μm in thickness and about 20 g/m² in basis weight in a continuous rollercoating process at a belt speed of about 8 m/h and T=200° C. In this rollercoating process, the slip is coated onto the nonwoven using a roller turning opposite to the belt direction (the direction of movement of the nonwoven). The nonwoven subsequently passes through an oven at the stated temperature. The subsequent tests utilize the same method and arrangement for coating. The end result obtained is a separator having an average pore size of 450 nm and a thickness of about 50 μm. The Gurley number is about 6.

Concurrently, the above slip is used to produce a solid molding, likewise dried and solidified at 200° C. The porosity is about 47% and the average pore size is 450 nm.

EXAMPLE 2

Production of an S750PET Separator

To 130 g of water and 30 g of ethanol are initially added 30 g of a 5% by weight aqueous $HNO_3$ solution, 10 g of tetraethoxysilane, 2.5 g of methyltriethoxy-silane and 7.5 g of GLYMO Dynasilane (all Dynasilanes produced by Degussa AG). This sol, which was initially stirred for some hours, is then used to suspend 260 g of CL3000 SG (from AlCoA). This slip is homogenized with a magnetic stirrer for at least a further 24 h, during which the stirred vessel has to be covered over in order that solvent may not escape. Prior to coating, this slip is filtered through a 20 μm sieve to remove the coarse fraction.

A PET nonwoven about 15 μm in thickness and about 6 g/m² in basis weight is coated with the above slip in a continuous rollercoating process at a belt speed of about 8 m/h and T=200° C. The end result obtained is a separator having an average pore size of 755 nm and a thickness of 30 μm. The Gurley number is about 3.

Concurrently, the above slip is used to produce a solid molding, likewise dried and solidified at 200° C. The porosity is about 51% and the average pore size is 755 nm.

EXAMPLE 3

Production of an S850PET Separator

To 145 g of water and 15 g of ethanol are initially added 30 g of a 5% by weight aqueous $HNO_3$ solution, 10 g of tetraethoxysilane, 2.5 g of methyltriethoxy-silane and 7.5 g of GLYMO Dynasilane (all Dynasilanes produced by Degussa AG). This sol, which was initially stirred for some hours, is then used to suspend 280 g of HVA SG (from AlCoA). This slip is homogenized with a magnetic stirrer for at least a further 24 h, during which the stirred vessel has to be covered over in order that solvent may not escape. Prior to coating, this slip is filtered through a 15 μm sieve to remove the coarse fraction.

A PET nonwoven about 15 μm in thickness and about 6 g/m² in basis weight is coated with the above slip in a continuous rollercoating process at a belt speed of about 8 m/h and T=200° C. The end result obtained is a separator having an average pore size of 865 nm and a thickness of 30 μm. The Gurley number is about 2.

Concurrently, the above slip is used to produce a solid molding, likewise dried and solidified at 200° C. The porosity is about 53% and the average pore size is 865 nm.

EXAMPLE 4

Lithium Ion Battery with Hybrid Ceramic Separator

An S450PET separator produced as per example 1 is installed in a lithium ion cell consisting of a positive mass of $LiCoO_2$, a negative mass consisting of graphite and an electrolyte composed of $LiPF_6$ in ethylene carbonate/dimethyl carbonate [LiCoO2//S-450-PET, EC/DMC 1:1, 1M $LiPF_6$// graphite]. The charging and discharging behavior of this battery was tested. The battery decreases in load capacity only minimally, by a few percentage points, after about 250 cycles of charging/discharging at C/5. Even increasing the charging voltage from 4.1 to 4.2 volts in the 200th charge cycle does not harm the battery.

But on discharging this battery at C (about 3 mA/cm$^2$) it is found that at these high currents it is impossible to discharge the entire capacity. This is attributable to the internal resistance which is still too high.

EXAMPLE 5

Lithium Ion Battery with Hybrid Ceramic Separator

An S850PET separator produced as per example 3 is installed in a lithium ion cell consisting of a positive mass of LiCoO$_2$, a negative mass consisting of graphite and an electrolyte composed of LiPF$_6$ in ethylene carbonate/dimethyl carbonate [LiCoO2//S-450-PET, EC/DMC 1:1, 1M LiPF$_6$//graphite]. The charging and discharging behavior of this battery was tested.

The battery decreases in load capacity only minimally, by a few percentage points, after about 250 cycles of charging/discharging at C/5. Even increasing the charging voltage from 4.1 to 4.2 volts in the 200th charge cycle does not harm the battery.

On discharging this battery at C (about 3 mA/cm$^2$) it is found that virtually the entire capacity of the battery can be discharged at these high currents. This is attributable to higher porosity, lower thickness, larger pore size and hence lower internal resistance compared with example 4.

This separator is thus particularly suitable for a high current battery.

What is claimed is:

1. A process for producing a separator comprising a flexible nonwoven having a porous inorganic coating on and in said nonwoven, and wherein the material of said nonwoven is selected from non-woven, nonelectroconductive polymeric fibers, and wherein said nonwoven has a thickness of less than 30 μm, a porosity of more than 50% and a pore radius distribution, in which at least 50% of the pores have a pore radius from 75 to 150 μm, which process comprises:
   applying to the nonwoven a suspension comprising oxide particles and at least one sol, and heating one or more times to solidify said suspension on and in said nonwoven, wherein the separator comprises.

2. The process of claim 1, wherein said suspension comprises oxide particles, having an average particle diameter from 0.5 to 7 μm, of the elements Al, Zr and/or Si, and at least one sol.

3. The process of claim 1, wherein said suspension is brought onto and into said nonwoven by printing on, pressing on, pressing in, rolling on, knifecoating on, spreadcoating on, dipping, spraying or pouring on.

4. The process of claim 1, wherein said polymeric fibers are selected from the fibers of polyacrylonitrile, polyester or polyolefin.

5. The process of claim 1, wherein said suspension comprises at least one sol of the elements Al, Zr and/or Si, and is prepared by suspending oxide particles in at least one of these sols.

6. The process of claim 5, wherein said sols are obtained by hydrolyzing at least one compound of the elements Al, Zr and/or Si, with water or an acid or a combination thereof.

7. The process of claim 6, wherein said hydrolyzing is effected on at least one alkoxide compound of the elements Zr, Al and/or Si, or at least one nitrate, carbonate or halide selected from the compounds of the elements Zr, Al, Si or mixtures thereof.

8. The process of claim 1, wherein said metal oxide particles are aluminum oxide particles having an average particle size from 0.5 to 7 μm.

9. The process of claim 5, wherein the mass fraction of said suspended metal oxide particles is from 1 to 10 times that of the sol used.

10. The process of claim 1, wherein said suspension, present on and in said nonwoven, is solidified by heating to 50-350° C.

11. The process of claim 10, wherein said heating is effected at 110 to 280° C. for 0.5 to 10 minutes.

* * * * *